US011509946B1

(12) United States Patent
Liu et al.

(10) Patent No.: US 11,509,946 B1
(45) Date of Patent: Nov. 22, 2022

(54) METHODS AND SYSTEMS CONFIGURED TO MANAGE VIDEO TRANSCODER LATENCIES

(71) Applicant: Pluto Inc., West Hollywood, CA (US)

(72) Inventors: Kevin Liu, Culver City, CA (US); Terrence Mullane, Jr., Seattle, WA (US)

(73) Assignee: Pluto Inc., West Hollywood, CA (US)

( * ) Notice: Subject to any disclaimer, the term of this patent is extended or adjusted under 35 U.S.C. 154(b) by 0 days.

(21) Appl. No.: 17/453,979

(22) Filed: Nov. 8, 2021

(51) Int. Cl.
| | |
|---|---|
| H04N 7/16 | (2011.01) |
| H04N 21/2343 | (2011.01) |
| H04N 21/24 | (2011.01) |
| H04N 21/2187 | (2011.01) |
| H04N 21/231 | (2011.01) |
| H04L 65/75 | (2022.01) |

(52) U.S. Cl.
CPC ......... *H04N 21/2343* (2013.01); *H04L 65/75* (2022.05); *H04N 21/2187* (2013.01); *H04N 21/23106* (2013.01); *H04N 21/2402* (2013.01)

(58) Field of Classification Search
CPC .......... H04N 21/2343; H04N 21/2187; H04N 21/23106; H04N 21/2402; H04L 65/75
See application file for complete search history.

(56) References Cited

U.S. PATENT DOCUMENTS

| 5,411,493 A | 5/1995 | Rodriguez |
| 6,423,047 B1 | 7/2002 | Webster |
| 6,982,780 B2 | 1/2006 | Morley |
| 8,483,393 B2 | 7/2013 | Robert |
| 8,745,023 B2 | 6/2014 | Libin |
| 9,077,667 B2 * | 7/2015 | Sridhar .................. H04L 65/65 |
| 9,258,589 B2 | 2/2016 | Grouf et al. |

(Continued)

FOREIGN PATENT DOCUMENTS

| WO | WO 2015/123572 A1 | 8/2015 |
| WO | WO 2018/009408 A2 | 1/2018 |

(Continued)

OTHER PUBLICATIONS

U.S. Appl. No. 17/449,076, filed Sep. 27, 2021, Shanson et al.
U.S. Appl. No. 17/451,715, filed Oct. 21, 2021, Hou.

*Primary Examiner* — Gigi L Dubasky
(74) *Attorney, Agent, or Firm* — Knobbe, Martens, Olson & Bear LLP

(57) ABSTRACT

Systems and methods configured to detect and manage video transcoder latencies are described. A manifest is received and is used to request video segments included in a manifest playlist. A transcoder having an input and output is used to transcode video segments. A delta time for a first SCTE-35 marker between the transcoder input and the transcoder output is determined, where the delta time corresponds to a transcoder latency. A determination is made as to whether a corrective action needs to be taken with respect to the latency, and such corrective action is taken as needed. The corrective action may include a transcoder reset. The manifest may be a text file and may be in the form of an HLS or DASH manifest. Additionally, streaming latencies may be reduced by switching content distribution systems, increasing the number of edge systems distributing content to clients, and/or by increasing video cache memory.

23 Claims, 7 Drawing Sheets

(56) References Cited

U.S. PATENT DOCUMENTS

| | | |
|---|---|---|
| 9,301,020 B2 | 3/2016 | Sun |
| 9,584,874 B1 | 2/2017 | Farfas |
| 9,699,515 B2 | 7/2017 | Grouf et al. |
| 9,712,884 B2 | 7/2017 | Grouf et al. |
| 9,998,787 B2 | 6/2018 | Grouf et al. |
| 10,104,445 B2 | 10/2018 | Patel |
| 10,200,434 B1* | 2/2019 | Wells ............... H04N 21/4385 |
| 10,231,018 B2 | 3/2019 | Grouf et al. |
| 10,327,037 B2 | 6/2019 | Shanson et al. |
| 10,356,447 B2 | 7/2019 | Shanson |
| 10,356,480 B2 | 7/2019 | Hou et al. |
| 10,560,746 B2 | 2/2020 | Grouf et al. |
| 10,681,431 B2 | 6/2020 | Levy |
| 10,715,848 B2 | 7/2020 | Hou |
| 10,820,066 B2 | 10/2020 | Caulfield |
| 10,902,474 B2 | 1/2021 | Lo |
| 10,931,990 B2 | 2/2021 | Hou |
| 10,939,168 B2 | 3/2021 | Grouf et al. |
| 11,178,433 B2 | 11/2021 | Hou |
| 2002/0121273 A1 | 9/2002 | Nyilas |
| 2004/0088737 A1 | 5/2004 | Donlan |
| 2007/0294710 A1 | 12/2007 | Meesseman |
| 2007/0294734 A1 | 12/2007 | Arsenault |
| 2008/0114880 A1 | 5/2008 | Jogand-Coulomb |
| 2008/0194276 A1 | 8/2008 | Lin |
| 2008/0270462 A1 | 10/2008 | Thomsen |
| 2009/0133090 A1 | 5/2009 | Busse |
| 2010/0021512 A1 | 1/2010 | Arron |
| 2010/0138297 A1 | 6/2010 | Fitzgerald |
| 2010/0138298 A1 | 6/2010 | Fitzgerald |
| 2010/0299264 A1 | 11/2010 | Berger |
| 2011/0225315 A1 | 9/2011 | Wexler et al. |
| 2012/0147952 A1 | 6/2012 | Cote et al. |
| 2013/0148741 A1 | 6/2013 | Steinberg et al. |
| 2013/0175333 A1 | 7/2013 | Gilbert |
| 2014/0373041 A1 | 12/2014 | Yan |
| 2015/0078729 A1* | 3/2015 | Sipe ............... H04N 21/440245 386/241 |
| 2015/0245074 A1 | 8/2015 | Gordon et al. |
| 2018/0069950 A1* | 3/2018 | Eswaran ............ H04N 21/2343 |
| 2020/0084486 A1 | 3/2020 | Cho |
| 2020/0374602 A1* | 11/2020 | Riedel ............... H04N 21/2187 |
| 2021/0044869 A1 | 2/2021 | Grouf et al. |
| 2021/0168452 A1 | 6/2021 | Grouf et al. |
| 2021/0195290 A1* | 6/2021 | Mayhew ............. H04L 65/75 |
| 2021/0204010 A1 | 7/2021 | Hou |
| 2021/0362030 A1 | 11/2021 | Putnam |

FOREIGN PATENT DOCUMENTS

| | | |
|---|---|---|
| WO | WO 2019/060554 A3 | 3/2019 |
| WO | WO 2019/217468 A1 | 11/2019 |

* cited by examiner

METHODS AND SYSTEMS CONFIGURED TO MANAGE VIDEO TRANSCODER LATENCIES

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

COPYRIGHT RIGHTS

A portion of the disclosure of this patent document contains material that is subject to copyright protection. The copyright owner has no objection to the reproduction by any one of the patent document or the patent disclosure, as it appears in the patent and trademark office patent file or records, but otherwise reserves all copyright rights whatsoever.

BACKGROUND

Field of the Invention

The present invention is related to the transcoding of content.

Description of the Related Art

Video streaming services have become ever more popular. Certain video streaming services provide on-demand content, while others provide linear programmed streaming content, which video content is streamed to viewers in accordance with an electronic program guide schedule. However, particularly in the instance of live streaming, the transcoding process may introduce undesirable latencies. Such latencies may indicate a technical problem and provide a poor user experience.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An aspect of the present disclosure relates to a system configured to manage transcoder latencies, comprising: a network interface; at least one processing device; non-transitory memory storing programmatic code that when executed by the at least one processing device, cause the system to: receive a first manifest corresponding to video content, the first manifest comprising a playlist of one or more video segments; request the video segments from one or more content provider systems; receive video segment streams corresponding to the requested video segments; detect a first SCTE-35 marker prior to performing a transcoding operation using a transcoder on at least a first video segment, wherein the transcoder has an input and output, and is configured to leave the first SCTE-35 marker unmodified by the transcoding; record a first timestamp associated with the first SCTE-35 marker prior to performing a transcoding operation on at least the first video segment; transcode video content comprising the first video segment using the transcoder; detect the first SCTE-35 marker output by the transcoder; record a second timestamp associated with the first SCTE-35 marker output by the transcoder; determine a delta between the first timestamp associated with the first SCTE-35 marker and the second timestamp associated with the first SCTE-35 marker, the delta corresponding to a transcoder latency; based at least on the determined delta between the first timestamp associated with the first SCTE-35 marker and the second timestamp associated with the first SCTE-35 marker, the delta corresponding to a transcoder latency, determine whether a first corrective action configured to reduce transcoder latency is to be taken; and at least partly in response to determining that the first corrective action configured to reduce transcoder latency is to be taken, cause the first corrective action to be taken.

An aspect of the present disclosure relates to a computer-implemented method comprising: accessing a first manifest and/or first set of metadata corresponding to video content, the first manifest comprising a playlist of one or more video segments; requesting the video segments from one or more content provider systems; receiving video segment streams corresponding to the requested video segments; detecting a first marker prior to performing a transcoding operation on at least a first video segment; recording a first timestamp associated with the first marker prior to performing a transcoding operation on at least the first video segment; transcoding video content comprising the first video segment using the transcoder having an input and an output; detecting the first marker output by the transcoder; recording a second timestamp associated with the first marker output by the transcoder; determining a delta between the first timestamp associated with the first marker and the second timestamp associated with the first marker, the delta corresponding to a transcoder latency; based at least on the determined delta between the first timestamp associated with the first marker and the second timestamp associated with the first marker, the delta corresponding to a transcoder latency, determining whether a first corrective action configured to reduce transcoder latency is to be taken; and at least partly in response to determining that the first corrective action configured to reduce transcoder latency is to be taken, causing the first corrective action to be taken.

An aspect of the present disclosure relates to a non-transitory computer-readable media including computer-executable instructions that, when executed by a computer system, cause the computer system to at least perform operations comprising: request streaming video segments from one or more content provider systems; receive streaming video segment streams corresponding to the requested video segments; detect a first marker prior to performing a transcoding operation on at least a first video segment; record a first timestamp associated with the first marker prior to performing a transcoding operation on at least the first video segment; transcode video content comprising the first video segment using a transcoder having an input and an output; detect the first marker output by the transcoder; record a second timestamp associated with the first marker output by the transcoder; determine a delta between the first timestamp associated with the first marker and the second timestamp associated with the first marker, the delta corresponding to a transcoder latency; based at least on the determined delta between the first timestamp associated with the first marker and the second timestamp associated with the first marker, the delta corresponding to a transcoder latency, determine whether a first action is to be taken; and at least partly in response to determining that the first action is to be taken, cause the first action to be taken.

DETAILED DESCRIPTION

Figure 1:
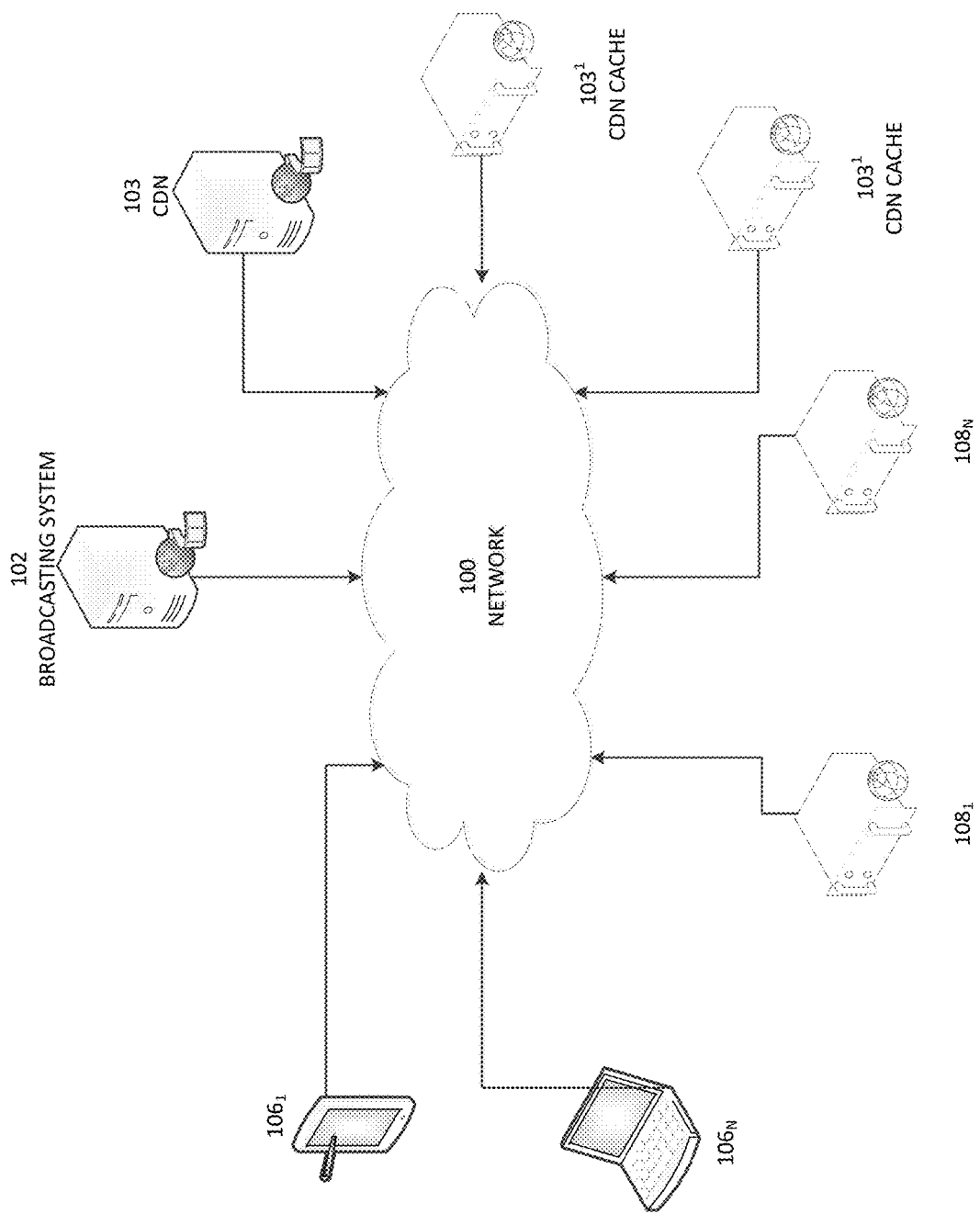
FIG. 1 illustrates an example system environment and certain components thereof.

Certain embodiments described herein overcome some or all of the noted deficiencies of conventional video streaming systems. Systems and methods are described configured to detect, accurately and reliably, when undesirable streaming latencies occur and to take remedial action to manage and reduce future latencies.

As will be described, live video feeds may be streamed from a first source (e.g., an athletic event operator, a concert operator, an awards show operator, other live event streaming system, or other third party content system) to an online broadcasting system that may be configured to receive content from different content providers and stream the content to the devices of users (e.g., subscribers) of the online broadcasting system.

The online broadcasting system may receive input from content providers via a playlist (e.g., in the form of a text file). By way of example, the playlist may be a live video-on-demand (VOD) HTTP Live Streaming (HLS) manifest, an MPEG DASH (Dynamic Adaptive Streaming over HTTP) manifest, or other playlist-type. The playlist may lay out the content video segments (e.g., an HLS or DASH manifest format), including primary content and interstitial content. The playlist may be received from a content provider system in response to a request from the online broadcasting system. If the HLS protocol is being used, the stream may be made available through a URL that returns an HLS.m3u8 file. The playlist may be received prior to the corresponding program video stream. The playlist may indicate the bitrates available for the video program and may optionally include a pointer to a manifest for a corresponding bitrate. The manifest may include information on subtitles, resolution, framerate, and the encoding type (in the format "video, audio"). The manifest may include, for respective program segments, a path (that is optionally relative to the playlist file's location) and the source of the stream. The receiving system may access and play each item of content in the defined order. By way of further example, metadata may be received in a stream that indicates the content to be streamed, which may be extracted and time-stamped.

Disadvantageously, the process of conforming the HLS stream to the online broadcasting system encode specifications can introduce latency. Such a process may include transcoding video files being streamed to the online broadcasting system. For example, transcoding may be performed to create multiple versions of the same video in different sizes so as to optimize the video for user devices having different available Internet speeds and different display sizes. Thus, video transcoding enables the online broadcasting system to deliver high-quality videos to user devices with fast Internet speeds while simultaneously delivering lower-resolution videos to user devices with slower Internet speeds. Advantageously, transcoding can be utilized to reduce buffering on client devices.

For example, buffering may occur when Internet speed is too slow to download the amount of data needed in time or where there is sufficiently large transcoding latency on the source side, where the user device may buffer the data for the video and then begin playing the video when there is enough data downloaded to prevent lag in the stream. If the video player reaches the point where it no longer has enough video data downloaded, the video player may pause the video, buffer video data, and resume playing the video when sufficient video data is downloaded and stored in the buffer.

As will be discussed, in order to decrease the latency, and thereby reduce buffering delays in the steaming of a video, a reliable measure of the latency is needed.

The transcoding process may receive live, compressed, encoded video content in a first format from a content provider system. The online broadcasting system, using a codec, may decompress the compressed video content and may convert the format of the video content from the first format to another format (which recompresses the video content).

By way of non-limiting limitation, the content provider system may provide the content encoded using MPEG2 (H.222/H.262), which is often used in over-the-air digital television broadcasting, to MPEG-4 Part 10 (H.264) video and for the audio track, AAC audio. The transcoding process may also add content to the video from the content provider, such as logos or other graphics.

The transcoding process may further perform transrating. For example, the transrating may convert the video bitrate from a relatively higher bitrate to a lower rate refers specifically to changing bitrates (e.g., converting from 150 Mbs for an 8K video stream to 13 Mbps for a 4K video stream).

The transcoding process may further perform transsizing, where the size of the video frames in the video stream may be changes from a first size to a second size refers specifically to resizing the video frame; say, from a resolution of 7680×4320 (8K UHD) to 1920×1080 (1080p).

Such transcoding can be critical to enable user devices to receive and reproduce video streams. For example, the bitrate may need to be reduced in order for user devices without adequate bandwidth to be able to receive and adequately reproduce the video content and to avoid undesirable buffering. By way of further example, the video content from a content provider may be encoded using a format that may not be supported by typical consumer devices (e.g., mobile phones, tablets, laptops, desktop computers, etc.).

Given that different user device and networks may have different capabilities and may be able to support different formats, bits rates, and frame resolutions, it may be desirable to have several different codecs creating multiple, time aligned streams, in multiple formats, with multiple resolutions at multiple bitrates, using different adaptive streaming formats (e.g., MPEG DASH, HLS, etc.).

Thus, another technical problem caused by such latencies is introduced because different transcoding processes for a given item of content may result in different transcoding induced latencies resulting in different streams of the same content becoming misaligned. Thus, different users will be seeing the same content in a time displaced manner. Such misalignment may result in certain users seeing time critical content (e.g., a scoring play in an athletic event, a result in a game show, etc.) before other users. Further, such misalignment may interfere with users that are conducting an online watch party, where multiple users are watching the same program at the same time on their respective devices and are conducting a chat (e.g., audio, video, and/or text chat) regarding the program in real time. If different people are watching portions of the program 1 or 2 minutes before other users, the corresponding chat may provide spoiler alerts and/or may be confusing.

While it may be possible to perform the transcoding process far in advance of the streaming process in the case of recorded content so that transcoding latency does not affect the actual video streaming of end user devices, this option is not available for live content. Thus, in the absence of latency management, the live streaming of content that needs to be transcoded will result in delays and in a poor viewing experience. For example, if a user is conducting an online chat regarding a sporting event while watching the live stream of the sporting event, if one user is experiences latency (e.g., 1 minute latency) and the other user does not, the user that is not experiencing latency may say something in the chat that reveals the result of the sporting event before the user that is experiencing the latency has an opportunity to view the result of the sporting event in the live stream.

One challenge in managing transcoding latency is measuring such latency, partly because the transcoding process may significantly alter the structure of the video content making it difficult to track header data and the like. Traditional approaches of measuring latency are cumbersome and prone to errors. For example, one conventional approach involves using a clapperboard application in conjunction with displaying the video on the input side of the transcoding process, taking a photograph of the input side clapperboard in conjunction with the displayed input video, using a clapperboard application in conjunction with displaying the video on the output side of the transcoding process, taking a photograph of the output side clapperboard in conjunction with the displayed output video, manually identify matching input and output frames, and subtract the corresponding time from the photographed input-side clapperboard from photographed output-side clapperboard to obtain the latency.

The playlist (e.g., HLS or DASH playlist) may optionally include SCTE-35 markers. Optionally, the playlist does not include SCTE-35 marker indications, however, SCTE-35 markers may be inserted into a video stream. An SCTE-35 marker may be utilized to signal a primary content event or an ancillary content event (e.g., an advertisement insertion opportunity in a transport stream indicating that an ad can be inserted in the stream at the specified timestamp and if it is inserted it should have a duration of a specified number seconds). The SCTE-35 packets may be multiplexed with video and audio packets in the transport stream. The SCTE-35 packet may include a splice_info_section that may include a splice_insert to signal a splice event. When an out_of_network_indicator in the splice_info_section is set to 1, it signals switching from a program (primary content) to an advertisement (a cue out event). When the out_of_network_indicator is set to 0, it signals a switch back to the program (a cue in event). Optionally, even though an ad marker is present, a corresponding ad is not received or displayed.

In order to solve the technical problems caused by such latencies, unique characteristics were identified within the unique ad marker (SCTE 35) and the ad marker is timestamped on the source feed and the unique ad marker is timestamped when available post-conditioning (post-transcoding). The delta between the ad marker timestamp on the source and the ad marker timestamp on the conditioned output side is calculated. The calculated difference between the timestamp results in a highly accurate latency measurement corresponding to the time it took to transcode or otherwise process the live video stream.

The foregoing latency calculation may be continuously performed in real time. The determined latency may be continuously or periodically transmitted to a destination system associated with the content provider which may engage in one or more processes to reduce or eliminate the cause of the latency. The latency data may be transmitted to a destination via a business communication platform. The latency data may be stored in a data store, such as a latency ledger that maintains a history of latency data. In addition or instead, the determined latency may be continuously or periodically visually presented via a dashboard user interface. An alert threshold may be set, wherein if the determined latency is greater than a set threshold, an alert message may be sent to one or more electronic destinations (e.g., an SMS/MMS address, an email address, a communication platform channel, etc.).

In addition to transcoder latencies, other streaming latencies may adversely affect the video streaming process and video playback on a client. Such streaming latencies are optionally monitored and detected. By way of illustration, streaming delays may be caused by insufficient network bandwidth (e.g., public Internet, satellite, and/or multiprotocol label switching (MPLS) network bandwidth), component delays in the video stream (e.g., an originating camera, an encoder, insufficient cache memory, etc.), and/or geographical distance between a content source (e.g., a CDN server) and a client device. Packet loss and jitter and corresponding error correction may also result in streaming latencies. Upon detection of such streaming latencies, one or more corrective actions may be taken. Such corrective actions may include a switch to a different content distribution system for the streaming of video segments, an increase in the number of edge systems distributing content to clients, and/or an increase in video cache memory.

An electronic program guide may be generated for one or more channels of linear programmed streaming content, which may include start times and end times for respective items of primary content. By way of example, an item of primary content may be in the form of a movie, an episode of a periodic series (e.g., a "television" series), a live event (e.g., a sporting event, awards show, or the like), a one-off show or special, a curated set of clips from one or more sources, and/or the like.

It may be desirable to display interstitial content (which may be referred to as ancillary content) between items of primary content or during a given item of primary content (where the display of the primary content is paused while the interstitial content is displayed). An item of primary content may be in the form of any entire program or movie, or a segment thereof.

An interstitial may be in the form of text, video, and/or audio content. The interstitial may be used to aid in tying or bridging programs into a channel. The interstitial may provide information regarding an upcoming clip or program. The interstitial may optionally be selected based at least in part on characteristics of a viewer (e.g., user preferences, user profile information, etc.) and/or of an interstitial provider. Rules may be defined to select an interstitial.

By way of example, the interstitial content may be selected that corresponds to the user's interests. The interstitial content may be in the form of a director of the primary content discussing the primary content, a quiz regarding the primary content advertising, quizzes, jokes, news, trivia, information regarding programs or channels, user submitted content (e.g., video, still image, text, etc.), sponsored content, and/or other non-primary content.

Optionally, an automated process of selecting and streaming transitions/interstitials between clips or programs may be utilized. Optionally, users located at different locations may be enabled to view the same content at the same time or their respective devices and may be enabled to conduct text, audio, and/or video chat while watching the same content.

Figure 2A:
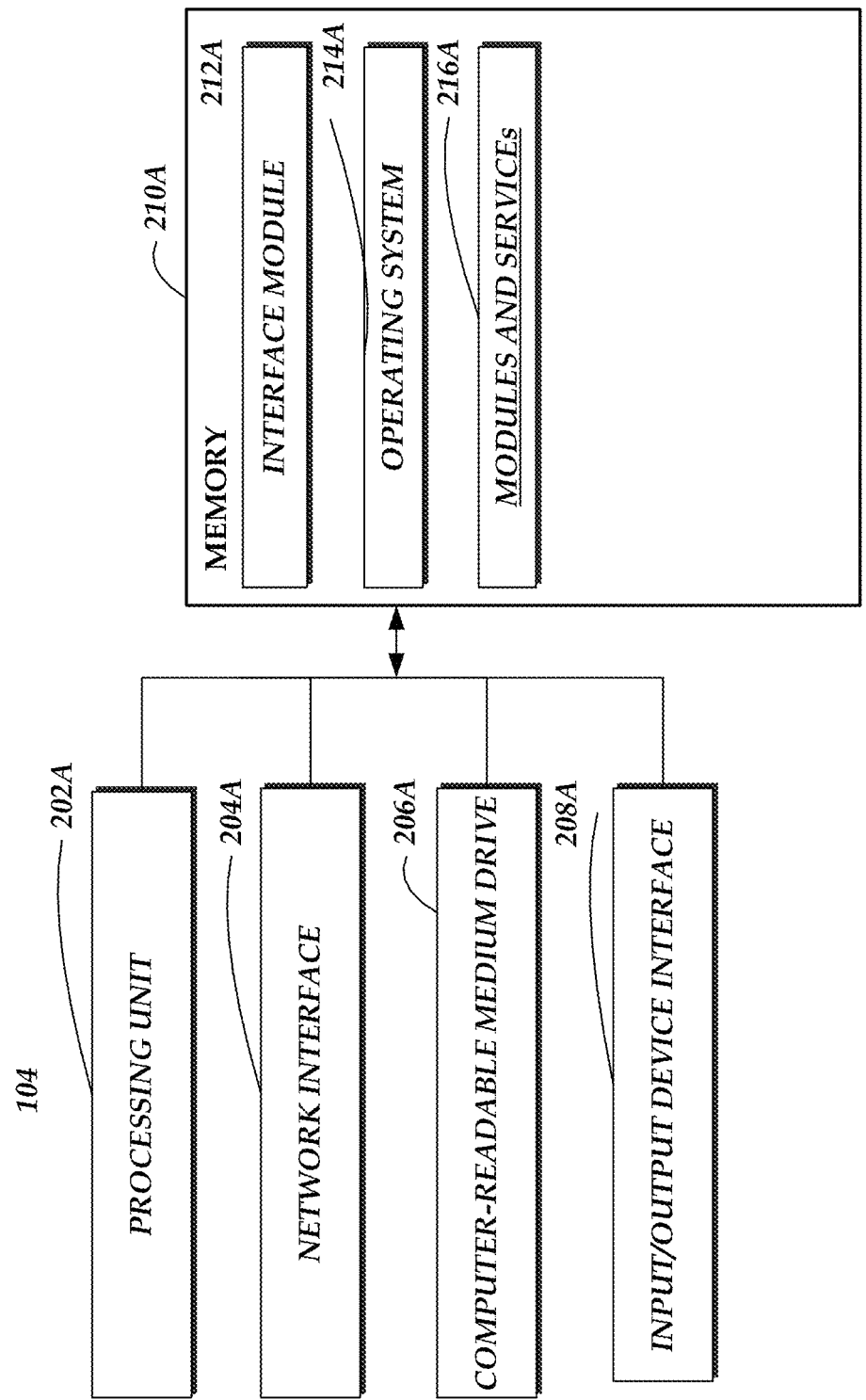
FIGS. 2A-2B illustrate an example architecture of an online video broadcast system.
Figure 2B:
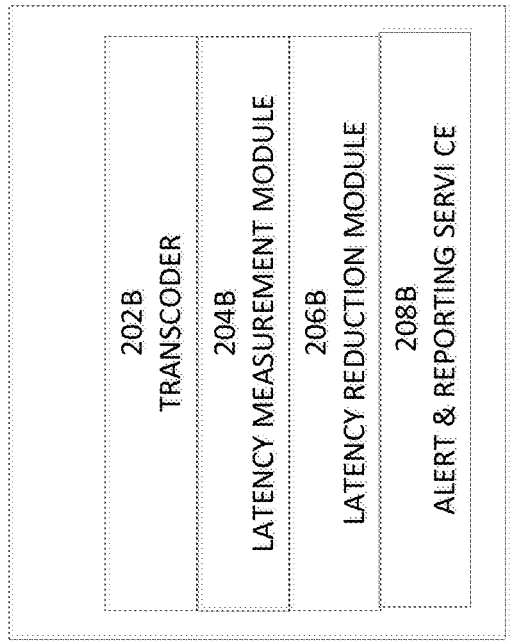

FIG. 1 illustrates an example online broadcasting system 102 in an example environment. FIGS. 2A-2B illustrate example components of the online broadcasting system 102. The online broadcasting system 102 may host a program guide (described in greater detail herein), program scheduling information, channel definitions, channel categories, user account information, video player schema information for video players or other content players from different websites, interstitial templates, interstitial set definitions, interstitial content, etc. The online broadcasting system 102 may include one or more of the following service modules, discussed in greater detail herein: a transcoder 202B, a latency measurement module 204B, a latency reduction module 206B, and an alert and reporting module 208B, and/or other modules. It is understood that the functions of the modules may be performed by fewer or more modules.

Referring again to FIG. 2A, the example online broadcasting system 102 includes a processing unit 202A, a network interface 204A, a non-transitory computer-readable medium drive 206A, and an input/output device interface 208A, all of which may communicate with one another by way of a communication bus. The network interface 208A may provide the online broadcasting system 102 with connectivity to one or more networks (e.g., network 100) or computing systems. The processing unit 202A may thus receive information and instructions from other computing devices, systems, or services, such as user terminals and third party content hosting services, via a network. The processing unit 202A may also communicate to and from memory 210A and further provide output information via the input/output device interface 208A. The input/output device interface 208A may also accept input from various input devices, such as a keyboard, mouse, digital pen, touch screen, etc.

The memory 210A may contain computer program instructions that the processing unit 202A may execute in order to implement one or more embodiments of the present disclosure. The memory 210A generally includes RAM, ROM and/or other persistent or non-transitory computer-readable storage media. The memory 210A may store an operating system 180 that provides computer program instructions for use by the processing unit 202A in the general administration and operation of the online broadcasting system 102. The memory 210A may further include other information for implementing aspects of the present disclosure.

Optionally, the memory 210A includes an interface module 212A. The interface module 212A can be configured to facilitate generating one or more interfaces through which a third party user, utilizing a compatible computing device, may send to, or receive from, the online broadcasting system 102 content, content metadata, preferences, content recommendations, instruction data, interstitials, interstitials templates and/or interstitial content, or otherwise communicate with the online broadcasting system 102. Specifically, the interface module 212A may be configured to facilitate processing functions described herein, including transcoding video streams, detecting and measuring latencies, reducing latencies, generating and providing program guides, scheduling programming, generating recommendations, providing program guide navigational tools, and/or other functions. The user interfaces described herein can be implemented as a graphical user interface (GUI), web-based user interface, computer program, smartphone or tablet program or application, touchscreen, command line interface, gesture, voice, or text interface, etc., or any combination thereof. A user may cause a program to be played by a content player by selecting a program from a program guide. A program may also be displayed without a user having to select a program or channel and without the display of a program guide. Further, the program guide need not be displayed to a user for the user to view or listen to programs or channels. For example, the user may access a program or channel via voice command (e.g., recognized by a voice command system), a body/hand gesture or a wand gesture (e.g., recognized by a camera-equipped gesture recognition system, or a wand motion tracking system), a remote control, or otherwise.

In addition, the memory 210A may include modules and services 216A that may be executed by the processing unit 202A. Optionally, the modules and services 216A implements aspects of the present disclosure. For example, the modules and services 216A can be configured to perform transcoding, detect and measure latencies, rectify latencies that exceed a given threshold and/or the result in a threshold impact on revenue (which may result by users navigating away from a poor viewing experience), generate alerts and reports, process user queries, instructions, data and content from data stores, etc.

The online broadcasting system 102 may communicate with a variety of third party content hosting CDN (content delivery network) systems 103 that cache content (such as images, videos, or webpages) in CDN caches $103_1$-$103_n$ acting proxy servers (sometimes referred to herein as edge servers) that are located closer to end users (e.g., user devices $106_1$-$106_n$) than the origin CDN system 103 well as other content hosting systems such as servers $108_1$-$108_n$. Because the CDN caches $103_1$-$103_n$ are closer to the user device making the request, the CDN 103 is able to deliver content more quickly. The CDN 103, CDN caches $103_1$-$103_n$, and servers $108_1$-$108_n$ (from which content may be streamed and/or interstitial and/or data for interstitials accessed) optionally are not operated by the same entity that operates the online broadcasting system 102.

The online broadcasting system 102 may cause content to be streamed, optionally in accordance with an electronic program guide, from the online broadcasting system 102 and the third party content hosting systems CDN 103, CDN caches $103_1$-$103_n$, servers $108_1$-$108_n$ to user devices $106_1$-$106_n$. The content may be linear programmed content with scheduled start and/or end times. The content may be provided via one or more defined channels. Optionally, a content programmer (sometimes referred to as a curator) defines a program and/or a channel. Optionally, a user may select a given channel or program via the electronic program guide.

For example, the content programmer may define a channel to be "cats". The content programmer may define a program for the "cats" channel to be "cats playing with dogs", with a time length of 30 minutes, to be provided to users at a specified day/time (or at recurring days/times).

The content streamed for the third party systems CDN 103, CDN caches $103_1$-$103_n$, servers $108_1$-$108_n$ may stream content in a form that is not compatible with the standards or needs of the online broadcasting system 102. For example, the resolution, bitrate, and/or format of video content may not be compatible or optimal for one or more types of user devices and/or clients hosted by the user devices. Thus, the video content may need to be transcoded to satisfy the needs and specifications of the online broadcasting system 102.

The online video broadcast system 102 may be configured as a cloud-based computer system. The cloud-based computer system may comprise a hosted computing environment that includes a collection of physical computing resources that may be remotely accessible, located at different facilities, and may be rapidly provisioned as needed (sometimes referred to as a "cloud" computing environment). Certain data described herein may optionally be stored using a data store that may comprise a hosted storage environment that includes a collection of physical data storage devices that may be remotely accessible and may be rapidly provisioned as needed (sometimes referred to as "cloud" storage).

Referring to FIG. 2B, the transcoder 202B may perform format conversions, frame transizing sizing operations to change frame resolutions, and/or transrating to modify (e.g., reduce the video bitrate. By way of illustrative example and as similarly discussed elsewhere herein, a content provider system may provide the video content encoded using MPEG2 (H.222/H.262) and the transcoder 202B may convert the video content to MPEG-4 Part 10 (H.264) video and for the audio track, AAC aud), which is more suitable for video streaming platforms. By way of further example, the transcoder 202B may convert the video content from a video content provide from MP4, WebM, FLV, MOV, OGV, 3GP, 3G2, WMV, MPEG, FLV, MKV, and/or AVI to HTML5 which is more suitable for playing videos via a webpage on a browser client hosted by a user device.

By way of further example, a content provider system may provide the video content as a 4K video stream at 10 Mbps and the transcoder 202B perform transsizing and transrating to may convert the video content to a lower rendition and/or lower-bitrate stream, such as HD at 6 Mbps, other renditions at 3 Mbps, still other renditions at 1.8 Mbps, and so on.

As similarly discussed above, such transcoding may introduce latencies. Such latencies are especially problematic when distributing live video content, where users expect to view the live content in real time. The latencies may be at least partly the result of technical problems on the content provider-side. For example, one or more of the foregoing may cause transcoding latency: if a video segment is not readily available from the content provider system, or if there is delay in downloading a video segment, or if the video streaming profile has changed from what is expected (e.g., the expected source profile is Full HD (1080p) at 10 Mbps, and the received video is QHD (1440p) at 20 Mbps), or if the number of frames per second (fps) changes, and/or if the GOP changes (if the distance between two I or P frames changes). By way of further example, latencies may be introduced if there is an inordinate amount of HDCP (High-definition Digital Content Protection) errors, which causes a memory buffer build up.

In order to efficiently and quickly address the technical problems that may cause such latency, it is advantageous to measure latencies in real time, determine, in real time, if a given latency is large enough to degrade a user experience or cause other problems, and rectify the technical problem(s) causing such latency, optionally in real time. The latency measurement module 204B is configured to automatically detect and measure transcoder latencies in real time. For example, as similarly discussed elsewhere herein, the latency measurement module 204B may calculate a time difference (a delta) between a timestamp of an SCTE-35 signal (e.g., a packet) on the input side of the transcoder and a timestamp of the same SCTE-35 signal on the output side of the transcoder. The latency measurement module 204B may be configured to detect if a given latency measurement exceeds a specified threshold, where if the measured latency exceeds the specified threshold, a technical problem is indicated and remedial action may be taken to reduce the latency to equal to or below the threshold. Optionally, in addition to or instead of determining a latency problem based on a single detection of a latency exceeding a threshold, the latency measurement module 204B may calculate a statistical mean (e.g., average) of latencies over a specified period of time, and if the statistical mean exceeds a corresponding threshold, a technical problem is indicated.

A latency reduction module 206B is configured to attempt one or more latency reductions corrective actions in response to the threshold being exceeded (e.g., for a single occurrence of a threshold being exceeded, for a threshold being exceeded more than a certain number of times over a specified time period, and/or for the for a threshold being exceeded over a specified time period by an average latency). For example, latency reduction module 206B may trigger more robust and frequent monitoring of latencies and other potential sources of problems (e.g., network transmission rates, network reliability to transfer video segments, HDCP errors, etc.), activate a restart of the transcoder 202B script, cause a different CDN to be used to deliver the video content, cause additional and/or different CDN cache edge servers to be used (e.g., geographically closer to the online broadcasting system 102), generate notifications to the content provider system, and/or the like. Optionally, the latencies may continue to be measured after a first corrective action is taken, and if the latencies continue to exceed the threshold, a second corrective action may be taken. The process of corrective action attempts may continue until the monitored latencies equal or are less than the threshold or all corrective actions are exhausted.

Figure 6:
FIG. 6 illustrates an example latency measurement user interface.

An alert and reporting service module 208B may be used to generate and transmit alerts and reports to one or more specified destinations. For example, if a latency (e.g., an individual latency or an average latency) exceeds a threshold such as described above, an alert may be transmitted to one or more destinations, such as one or more systems and/or one or more administrators so that the systems and/or administrators can take corrective action, such as those described herein. The report, an example of which is illustrated in FIG. 6, may include measured latencies over a specified time period and/or for a specific program. The report may be updated in real time as additional measurements are taken. The report may include, for a given program, the name of the program, the measured latencies for the program, corresponding unique latency identifiers (e.g., an alphanumeric identifier), the time a source segment is received at the transcoder, the time the segment is output by the transcoder, and the total latency (the difference in time between the segment is received at the input of the transcoder and the time the segment is output by the transcoder). An actions menu may be provided and used to select different program streams for the report.

The unique latency identifiers may optionally be generated from a corresponding marker identifier. For example, SCTE-35 markers can be very lengthy. In order to reduce the amount of memory needed to store unique latency identifiers and the amount of network bandwidth needed to transmit unique latency identifiers, the SCTE-35 markers may be encoded into just a few ASCII characters. By way of illustration, in the example illustrated in FIG. 6, SCTE-35 markers are encoded into strings comprising 5 alphanumeric characters.

Figure 3:
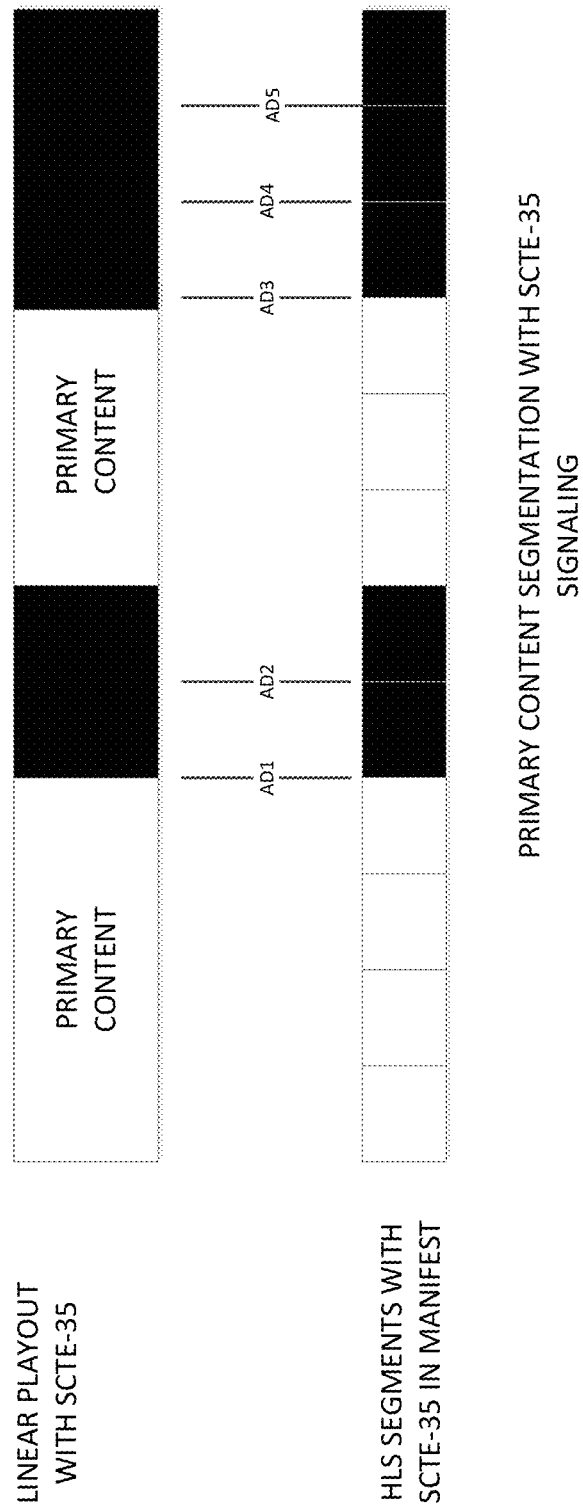
FIG. 3 illustrates an example video linear playout with SCTE markers in an HLS manifest.

Referring now to FIG. 3, an example video stream is illustrated. HLS segments include SCTE-35 signaling in the HLS manifest. A linear playout of video content includes primary content (e.g., a video program, such as a real time, live video program) and interstitial content (AD1, AD2, AD3, AD4, AD5) positioned between primary content segments. The items of interstitial content correspond to respective SCTE-35 markers. Although an SCTE-35 marker may signal an opportunity to insert interstitial content (e.g., an ad), optionally, an item of interstitial content is not inserted although the marker is present.

Figure 4:
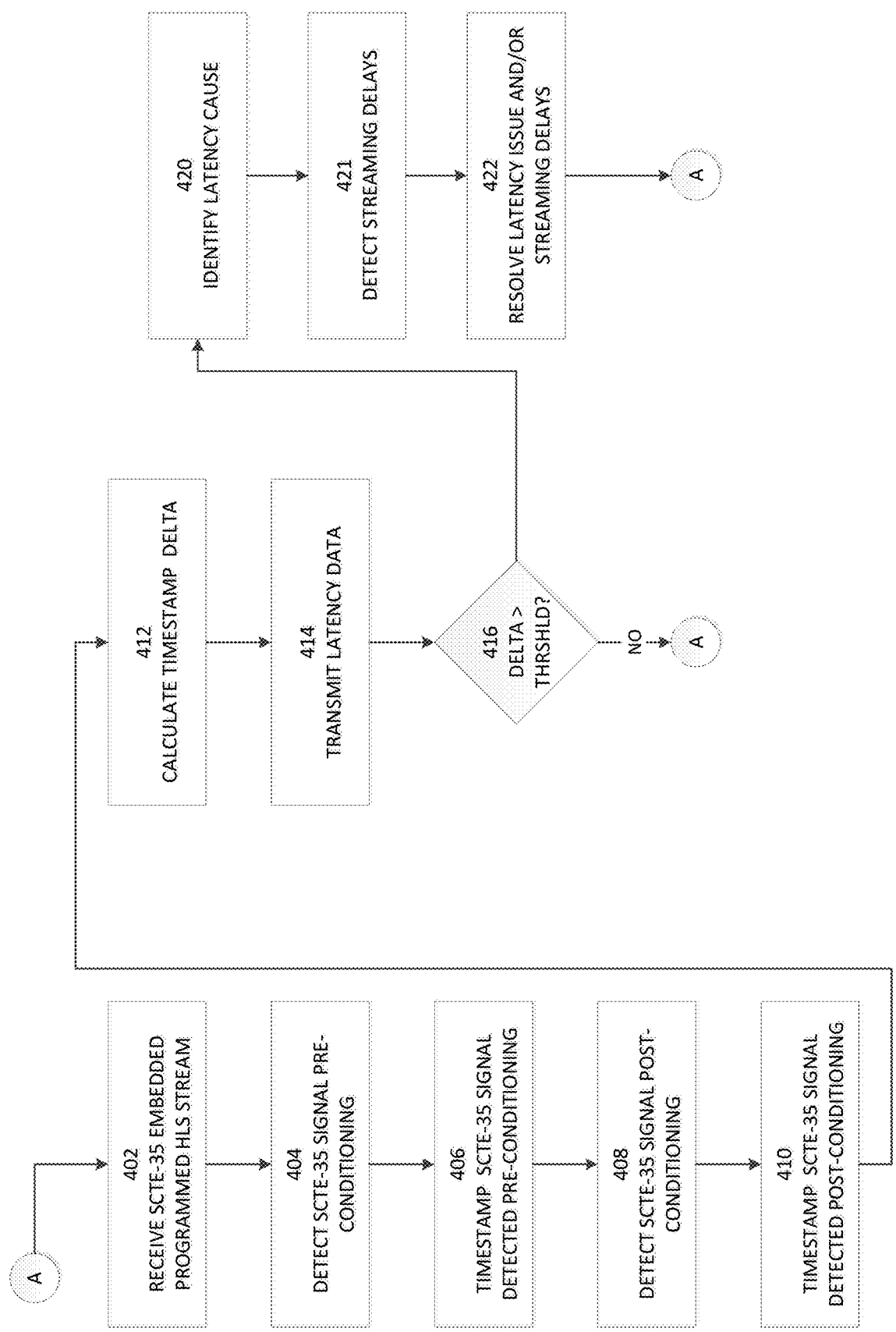
FIGS. 4 and 5 illustrate an example process of detecting, measuring, and managing transcoding latencies.
Figure 5:
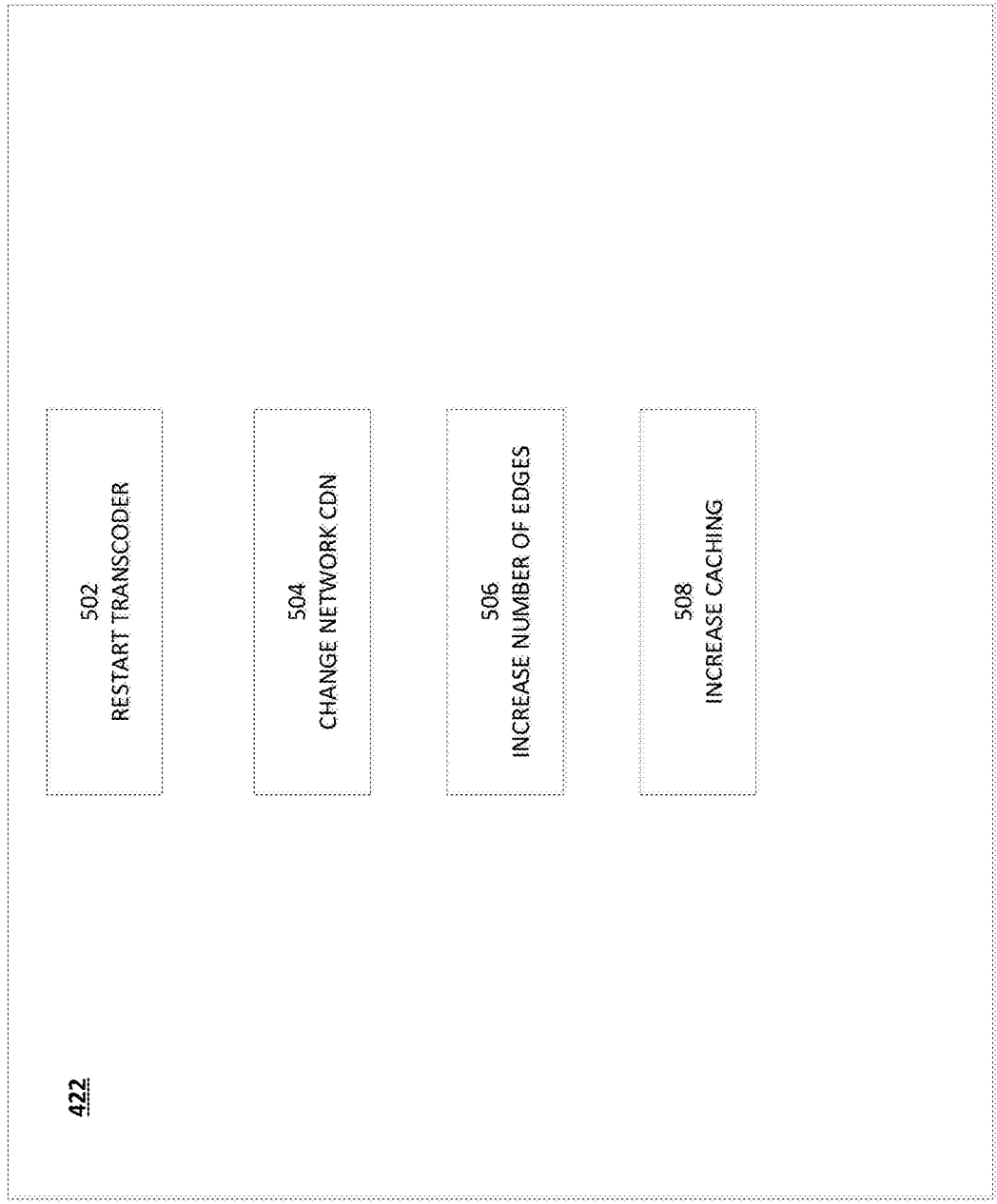

FIGS. 4 and 5 illustrate an example process for detecting, measuring, and reducing video transcoding latencies and streaming delays. The process may be executed using the online broadcasting system. It is understood that although the following example process may refer to SCTE-35 markers, other markers may be used that are not transformed by the transcoding process in a manner that would prevent latency measurements. Similarly, although HLS manifests may be referred to, other manifests, such as DASH manifests, may be used. At block 402, an SCTE-35 embedded programmed HLS stream is received at an online broadcast system, such as described elsewhere herein, from a content provider (e.g., a CDN, which may include a source system and one or more geographically displaced edge servers located closer to the online broadcast system and/or end user devices). The online broadcast system is optionally configured to stream or cause to be streamed content from its own content library, as well as content from other content provider systems, to user devices for viewing by users.

At block 404, the online broadcast system detects an SCTE-35 signal/marker prior to conditioning the HLS stream to conform the online broadcasting system encode specifications (e.g., via transcoding). At block 406, a timestamp is recorded in memory (e.g., in a latency log) corresponding to the SCTE-35 signal/marker on the input side of the transcoder. At block 408, the same SCTE-35 signal/marker (unmodified) is detected on the output side of the transcoder. At block 410, a timestamp is recorded in memory (e.g., in a latency log) corresponding to the SCTE-35 signal/marker on the output side of the transcoder.

At block 412, a delta is calculated between the recorded timestamp on the output side of the transcoder and the input side of the transcoder. For example, if the timestamps are in hours, minutes, seconds format, the timestamps may be converted to the smallest unit of time (seconds in this example), and a subtraction operation may be performed. Optionally, the delta of several latency measurements may be averaged to generate an average latency value.

At block 414, the calculated latency value (and/or optionally average latency value) may be recorded in memory (e.g., in a latency log) and/or transmitted to one or more destinations. The calculated latency value may be used to populate a real time report of latencies, such as discussed elsewhere herein with respect to FIG. 6.

At block 416, a determination is made as to whether the latency (and/or average latency) exceeds a specified threshold. For example, the threshold may be selected as indicative of a problem with the source stream (a video segment is not readily available from the content provider system, a delay in downloading a video segment, the video streaming profile has changed from what is expected, a change in the GOP, HDCP errors, etc.) and/or that indicates that the latency may cause video playback buffering delays on user devices, which results in a poor playback operations and viewing experience.

If the latency is less than or equal to the threshold, the process may repeat to measure the latency (and/or average latency) with respect to a subsequent SCTE-35 marker without taking actions to reduce the measured latency as the measured latency is acceptable.

If the latency (and/or average latency) is greater than the threshold, optionally, at block 420, an attempt may be made to identify the cause of the latency.

At block 421, streaming latencies are optionally monitored and measured. For example, streaming delays may be caused by insufficient network bandwidth (e.g., public internet, satellite, and/or multi-protocol label switching (MPLS) network bandwidth). Streaming delays may be caused by component delays in the video stream (e.g., an originating camera, an encoder, insufficient cache memory, etc.). Streaming delays may also be caused by the geographical distance between a content source (e.g., a CDN server) and a client device. Packet loss and jitter and corresponding error correction may also result in streaming latencies. By way of illustration, streaming latencies may be measured using a traceroute tool. The traceroute tool may be configured to examine network packets and track their movements across the network. For example, the traceroute tool may be configured to detect the number of hops a given packet took, the Internet Protocol addresses a given packed traversed, the aggregate roundtrip time, and/or the fastest time. If one or more of the foregoing parameters exceed a corresponding threshold, a determination may be made that the streaming latency needs to be reduced.

At block 422, one or more actions are taken to reduce the transcoding latency and/or streaming latencies by resolving the technical cause of the transcoder latency and/or streaming delays.

Referring to FIG. 5, example corrective actions are illustrated that may be performed at block 422 of FIG. 4. One or more of the illustrated actions may be taken and/or other corrective actions may be taken. Optionally, a given corrective action may be taken, a transcoder and or streaming latency measurement may be taken to determine if the corrective action reduced latencies to an acceptable value, and if the latency measurement indicates that the latency is at an acceptable level, no further corrective actions are taken unless subsequent unacceptable latencies are detected. If instead, the latency measurement indicates that the latency is at an unacceptable level, further corrective action may be taken. Optionally, several corrective actions may be taken in parallel or serially.

At block 502, the transcoder may be restarted (e.g., transcoder script and/or transcoder hardware) to resolve transcoder latencies.

At block 504, a different CDN may be utilized to access the video content to reduce streaming latencies. For example, a multi-CDN solution may be implemented where the streaming process may be dynamically switched (optionally in real time) from a poor performing CDN to a CDN with better performance.

At block 506, the number of edge distribution systems (e.g., CDN proxy/edge servers that cache video content) may be increased so that the content is available at a geographical point closer to the online broadcast system and/or end user devices to thereby reduce streaming latencies.

At block 508, the amount of video caching may be increased by increasing the cache memory size for caching video content to reduce streaming latencies.

Thus, systems and methods are described that improve the technical performance of an online content broadcast system by detecting and reducing latencies.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the phrase "click" may be used with respect to a user selecting a control, menu selection, or the like, other user inputs may be used, such as voice commands, text entry, gestures, etc. User inputs may, by way of example, be provided via an interface, such as via text fields, wherein a user enters text, and/or via a menu selection (e.g., a drop down menu, a list or other arrangement via which the user can check via a check box or otherwise make a selection or selections, a group of individually selectable icons, etc.). When the user provides an input or activates a control, a corresponding computing system may perform the corresponding operation. Some or all of the data, inputs and instructions provided by a user may optionally be stored in a system data store (e.g., a database), from which the system may access and retrieve such data, inputs, and instructions. The notifications and user interfaces described herein may be provided via a Web page, a dedicated or non-dedicated phone application, computer application, a business communication platform, a short messaging service message (e.g., SMS, MMS, etc.), instant messaging, email, push notification, audibly, and/or otherwise.

The user terminals described herein may be in the form of a mobile communication device (e.g., a cell phone), laptop, tablet computer, interactive television, game console, media streaming device, head-wearable display, networked watch, etc. The user terminals may optionally include displays, user input devices (e.g., touchscreen, keyboard, mouse, voice recognition, etc.), network interfaces, etc.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system configured to manage transcoder latencies, comprising:
    a network interface;
    at least one processing device;
    non-transitory memory storing programmatic code that when executed by the at least one processing device, cause the system to:
    receive a first manifest corresponding to video content, the first manifest comprising a playlist of one or more video segments;
    request the video segments from one or more content provider systems;
    receive video segment streams corresponding to the requested video segments;
    detect a first Society of Cable and Telecommunications Engineers (SCTE)-35 marker prior to performing a transcoding operation using a transcoder on at least a first video segment, wherein the transcoder has an input and output, and is configured to leave the first SCTE-35 marker unmodified by the transcoding;
    record a first timestamp associated with the first SCTE-35 marker prior to performing a transcoding operation on at least the first video segment;
    transcode video content comprising the first video segment using the transcoder;
    detect the first SCTE-35 marker output by the transcoder;
    record a second timestamp associated with the first SCTE-35 marker output by the transcoder;
    determine a delta between the first timestamp associated with the first SCTE-35 marker and the second timestamp associated with the first SCTE-35 marker, the delta corresponding to a transcoder latency;
    based at least on the determined delta between the first timestamp associated with the first SCTE-35 marker and the second timestamp associated with the first SCTE-35 marker, the delta corresponding to a transcoder latency, determine whether a first corrective action configured to reduce transcoder latency is to be taken; and
    at least partly in response to determining that the first corrective action configured to reduce transcoder latency is to be taken, cause the first corrective action to be taken.

2. The system as defined in claim 1, wherein the first corrective action comprises a restart of the transcoder.

3. The system as defined in claim 1, wherein the system is configured to detect a streaming latency from a first content distribution network, and cause a video segment to be streamed from a second content distribution network instead of the first content distribution network.

4. The system as defined in claim 1, wherein the system is configured to detect and reduce a streaming latency by increasing a cache memory size for caching video content.

5. The system as defined in claim 1, wherein the first corrective action comprises generating an alert.

6. The system as defined in claim 1, wherein the system is configured to generate a real time log of transcoder latencies, the real time log comprising a program name associated with the transcoder latencies, and for respective latencies, a latency identifier, an SCTE-35 marker transcoder input time stamp, an SCTE-35 marker transcoder output time stamp, and a latency.

7. The system as defined in claim 1, wherein the first manifest comprises a Hypertext Transfer Protocol (HTTP) Live Streaming (HLS) manifest or an MPEG DASH (Moving Picture Experts Group Dynamic Adaptive Streaming over HTTP) manifest.

8. The system as defined in claim 1, wherein the transcoding comprises performing a format conversion, a size conversion, and/or bitrate modification.

9. A computer-implemented method comprising:
    accessing a first manifest or first set of metadata corresponding to video content, the first manifest comprising a playlist of one or more video segments;
    requesting the video segments from one or more content provider systems, wherein the request of streaming video segments from one or more content provider systems is performed at least partly in response to receiving the first manifest or first set of metadata;
    receiving video segment streams corresponding to the requested video segments;
    detecting a first marker prior to performing a transcoding operation on at least a first video segment, wherein the first marker comprises a Society of Cable and Telecommunications Engineers (SCTE)-35 marker, and leaving the first SCTE-35 marker unmodified by the transcoding;
    recording a first timestamp associated with the first marker prior to performing a transcoding operation on at least the first video segment;
    transcoding video content comprising the first video segment using the transcoder having an input and an output;
    detecting the first marker output by the transcoder;
    recording a second timestamp associated with the first marker output by the transcoder;
    determining a delta between the first timestamp associated with the first marker and the second timestamp associated with the first marker, the delta corresponding to a transcoder latency;
    based at least on the determined delta between the first timestamp associated with the first marker and the second timestamp associated with the first marker, the delta corresponding to a transcoder latency, determining whether a first corrective action configured to reduce transcoder latency is to be taken; and
    at least partly in response to determining that the first corrective action configured to reduce transcoder latency is to be taken, causing the first corrective action to be taken.

10. The computer-implemented method as defined in claim 9, wherein the first corrective action comprises a restart of the transcoder.

11. The computer-implemented method as defined in claim 9, the method further comprising:

detecting a first streaming latency associated with a first content distribution network; and at least partly in response to detecting the first streaming latency associated with the first content distribution network causing a video segment to be streamed from a second content distribution network instead of the first content distribution network.

12. The computer-implemented method as defined in claim 9, the method further comprising detecting and reducing a streaming latency by increasing a cache memory size for caching video content.

13. The computer-implemented method as defined in claim 9, wherein the first corrective action comprises generating an alert.

14. The computer-implemented method as defined in claim 9, the method further comprising generating a real time log of transcoder latencies, the real time log comprising a program name associated with the transcoder latencies, and for respective latencies, a latency identifier, a marker transcoder input time stamp, a marker transcoder output time stamp, and a latency.

15. The computer-implemented method as defined in claim 9, wherein the first manifest comprises a Hypertext Transfer Protocol (HTTP) Live Streaming (HLS) manifest or an MPEG DASH (Moving Picture Experts Group Dynamic Adaptive Streaming over HTTP) manifest.

16. The computer-implemented method as defined in claim 9, wherein the transcoding comprises performing a format conversion, a size conversion, and/or bitrate modification.

17. Non-transitory computer-readable media including computer-executable instructions that, when executed by a computer system, cause the computer system to at least perform operations comprising:

request streaming video segments from one or more content provider systems, wherein the request of streaming video segments from one or more content provider systems is performed at least partly in response to receiving a first manifest;

receive streaming video segment streams corresponding to the requested video segments;

detect a first marker prior to performing a transcoding operation on at least a first video segment, wherein the first marker comprises a Society of Cable and Telecommunications Engineers (SCTE)-35 marker, and leave the first SCTE-35 marker unmodified by the transcoding;

record a first timestamp associated with the first marker prior to performing a transcoding operation on at least the first video segment;

transcode video content comprising the first video segment using a transcoder having an input and an output;

detect the first marker output by the transcoder;

record a second timestamp associated with the first marker output by the transcoder;

determine a delta between the first timestamp associated with the first marker and the second timestamp associated with the first marker, the delta corresponding to a transcoder latency;

based at least on the determined delta between the first timestamp associated with the first marker and the second timestamp associated with the first marker, the delta corresponding to a transcoder latency, determine whether a first action is to be taken; and at least partly in response to determining that the first action is to be taken, cause the first action to be taken.

18. The non-transitory computer-readable media as defined in claim 17, wherein the first action comprises a restart of the transcoder.

19. The non-transitory computer-readable media as defined in claim 17, the operations further comprising:

detecting a streaming latency from a first content distribution network; and at least partly in response to detecting the streaming latency from the first content distribution network causing a second video segment to be streamed from a second content distribution network instead of the first content distribution network.

20. The non-transitory computer-readable media as defined in claim 17, the operations further comprising:

detecting a streaming latency; and at least partly in response to detecting the streaming latency, increasing a cache memory size for caching video content.

21. The non-transitory computer-readable media as defined in claim 17, wherein the first action comprises generating an alert.

22. The non-transitory computer-readable media as defined in claim 17, the operations further comprising generating a real time log of transcoder latencies, the real time log comprising a program name associated with the transcoder latencies, and for respective latencies, a latency identifier, a marker transcoder input time stamp, a marker transcoder output time stamp, and a latency.

23. The non-transitory computer-readable media as defined in claim 17, wherein the transcoding comprises performing a format conversion, a size conversion, and/or bitrate modification.

\* \* \* \* \*